United States Patent [19]
Ryzhikov

[11] Patent Number: 5,808,807
[45] Date of Patent: Sep. 15, 1998

[54] MICROSCOPE OBJECTIVE LENS WITH CEMENTED BICONVEX TRIPLET

[75] Inventor: Lev Ryzhikov, San Mateo, Calif.

[73] Assignee: Nikon Corporation, Japan

[21] Appl. No.: 759,202

[22] Filed: Dec. 4, 1996

[51] Int. Cl.⁶ .................................................. G02B 21/02
[52] U.S. Cl. ........................................... 359/661; 359/660
[58] Field of Search ..................................... 359/656, 657, 359/658, 659, 660, 661

[56] References Cited

U.S. PATENT DOCUMENTS

| | | | |
|---|---|---|---|
| 3,822,931 | 7/1974 | Matsubara | 359/658 |
| 4,232,940 | 11/1980 | Nakagawa | 359/658 |
| 4,588,264 | 5/1986 | Shimizu | 350/414 |
| 5,076,676 | 12/1991 | Saito | 359/656 |
| 5,103,341 | 4/1992 | Ulrich et al. | 359/657 |
| 5,121,255 | 6/1992 | Hayashi | 359/656 |
| 5,469,299 | 11/1995 | Nagano | 359/661 |

*Primary Examiner*—Scott J. Sugarman
*Attorney, Agent, or Firm*—Skjerven, Morrill, MacPherson, Franklin & Friel LLP; Norman R. Klivans; Michael J. Halbert

[57] ABSTRACT

An objective lens system for a microscope having a power of ×16 to ×24 and including first, second and third lens groups, the first lens group being a comparatively thick meniscus lens component, the second lens group being a biconvex positive cemented triplet consisting of a biconvex first lens component, a biconcave second lens component and a biconvex third lens component, and a third lens group being a two lens system including a biconvex positive singlet and a negative thin meniscus lens component, or a negative and a positive thin meniscus lens components, or a positive cemented doublet, and having a relatively small number of lens elements, with its aberration (especially spherical, astigmatic difference, curvature of field and chromatic aberrations) being favorably corrected.

16 Claims, 9 Drawing Sheets

MICROSCOPE OBJECTIVE LENS WITH CEMENTED BICONVEX TRIPLET

BACKGROUND OF THE INVENTION

1. Field of the Invention

This invention relates to a microscope objective lens system and more particularly, to a plan-achromatic microscope objective lens system with a magnification of about ×20.

2. Description of the Related Art

For known microscope objective lens systems of this kind, i.e. an achromatic microscope objective with a magnification about ×20, the spherical aberration, astigmatic difference, flatness of image and chromatic aberration are not very favorably corrected.

It is well known to use in a microscope objective lens system a triplet lens group which is a biconvex positive cemented triplet consisting of a biconvex first lens component, a biconcave second lens component, and a biconvex third lens component. See e.g. U.S. Pat. Nos. 5,121,255 (FIG. 3); 5,103,341 (FIGS. 1–3); and 5,469,299 (FIGS. 1–6).

However, these patents do not disclose adequate aberration correction with a minimum number of lens components, at ×20 magnification.

SUMMARY

In accordance with the present invention, an objective lens system for a microscope has an optical power in a range of about ×16 to ×24, has a relatively small number of lens components, and has favorably corrected spherical aberration, astigmatic difference, flatness of image and chromatic aberration compared with known plan-achromatic microscope objective lens systems. The microscope objective lens system disclosed herein has three lens groups and desirably has six lens elements. The first lens group is a comparatively thick meniscus lens component arranged concave toward the object side, the second lens group is a biconvex positive cemented triplet consisting of a biconvex positive first lens component, a biconcave negative second lens component and a biconvex positive third lens component, and the third lens group is a biconvex positive singlet and a negative thin meniscus lens component, or a negative and a positive thin meniscus lens component, or a positive cemented doublet.

It is preferable that the present microscope objective lens system also satisfies the following conditions:

$$n_4 \geq 1.75 \quad (1)$$

$$0.5 < \phi_1/\phi_2 < 1 \quad (2)$$

$$1.8 < \phi_2/\phi_3 < 2.2 \quad (3)$$

$$\nu_3 + \nu_4 + \nu_5 \geq 125 \quad (4)$$

$$0.06 \leq n_4/\nu_4 \leq 0.1 \quad (5)$$

Wherein $n_4$ is the index of refraction of the biconcave second lens component of the second lens group, $\phi_1$ is the absolute value of the refractive power of the first lens component of the second lens group, $\phi_2$ is the absolute value of the refractive power of the second lens component of the second lens group, $\phi_3$ is the absolute value of the refractive power of the third lens component of the second lens group, and $\nu_3, \nu_4, \nu_5$ respectively are the Abbe numbers of the first, second, and third lens components of the second lens group, from object to image side. Condition (1) is set to correct spherical aberration, including high orders, favorably by using a glass material with comparatively high refractive index for the negative biconcave lens component of the second lens group. Conditions (2) and (3) define relationships between the refractive power of all three lens components of the second lens group. Conditions (2) and (3) also define bending of the lens components and define the balance of aberration of the lens system as a whole. In condition (2), when $\phi_1$ exceeds the upper limit, that is, the relative power of the second lens component is lower than required by condition (2), it becomes difficult to correct for the curvature of field coma and spherical aberration. Further, when $\phi_1$ exceeds the lower limit of condition (2), that is the relative power of the second lens component is stronger than required by condition (2), the spherical aberration and coma are overcorrected.

Condition (3) defines refractive power and bending of the third lens group. In combination with conditions (1) and (2), condition (3) serves to eliminate curvature of the field and astigmatic difference by correcting Petzal's sum. If the value defined by condition (3) becomes out of range, the balance of aberration is disturbed.

Condition (4) relates to the achromatic lens components in the second lens group and serves to favorably correct longitudinal chromatic aberration and lateral chromatic aberration of the lens system as a whole.

If the value defined by condition (4) is smaller than 125, under-correction of lateral chromatic aberration becomes intolerably large when longitudinal chromatic aberration is satisfactory corrected.

Condition (5) defines the glass material of the biconcave negative lens component of the second lens group. If the upper limit defined by condition (5) is exceeded, lateral chromatic aberration is overcorrected. If the lower limit defined by condition (5) is exceeded, under correction of chromatic aberration occurs. It is preferable that an Abbe number of the biconcave negative second lens component in the second lens group is less than 29 to provide best performance for axial chromatic aberration correction. Axial chromatic aberration correction is best when the differences $\nu_2-\nu_4$ and $\nu_3-\nu_4$ are large. Therefore the smaller the Abbe number for the biconcave negative second lens component of the second lens group, the greater these differences will be, and accordingly the better the system will work with respect to providing chromatic aberration correction.

DETAILED DESCRIPTION

Embodiments of the present microscope objective lens system explained above are illustrated in FIGS. 1, 2, and 3.

It is to be understood that a microscope objective lens system is only one portion of a microscope; it is typically the portion nearest the object being imaged. Located between the objective lens system and the user are the tube lens and the eye piece, which in accordance with the present invention may be conventional. That is to say, the present objective lens system is usable in combination with well-known microscope tube lenses and eyepieces, which are not shown. Further, it is to be understood that the present objective lens is intended for use with visible light and not with ultraviolet light or other wavelengths.

Figure 1:
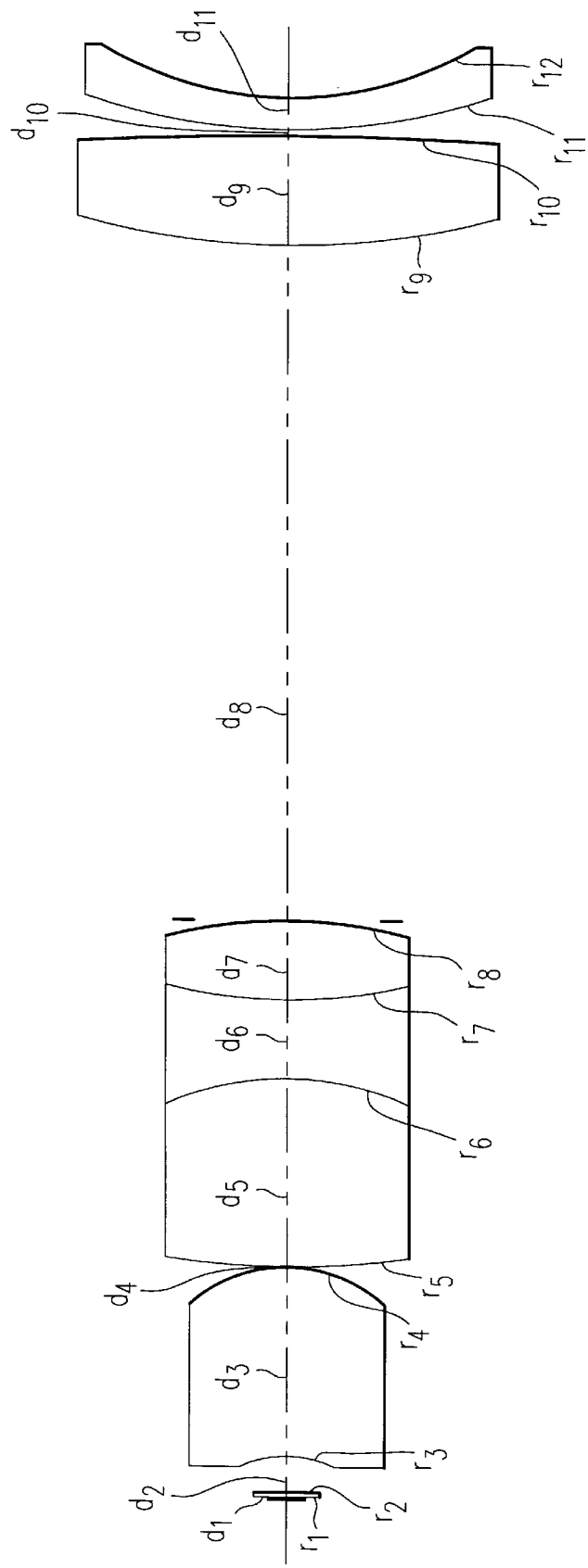
FIG. 1 shows a sectional view of Embodiment 1 of the present microscope objective lens system.

FIG. 1 is a conventional sectional view of Embodiment 1 of the present objective lens system. An optical listing for Embodiment 1 follows and FIG. 1 can be understood with reference to this listing. The object plane is located at $r_1$, where $d_1$ is the thickness of a cover glass, i.e. a microscope slide. It is to be understood that this objective lens system is a dry-type objective, i.e. no immersion oil. The optical listing for Embodiment 1 indicates that the focal length f of the objective microscope lens is 10 mm, the numerical aperture is 0.4, the optical power is 20, and the working distance Wd is 1.2 mm. The Petzal's sum and Strehl ratios are also shown. The Petzal's sum is a measurement of the planarity of the image, where a smaller value is more favorable. For a small value of the Petzal's sum as achieved here, there is no need for a special microscope eyepiece since there is no need to compensate for Petzal achromaticity.

The Strehl ratio is a measure of quality of the image, and is a ratio of the brightness of the image with aberration to the brightness of the image without aberration, where a value of one is ideal. The Strehl ratio is shown for three visible wavelengths.

Figure 2:
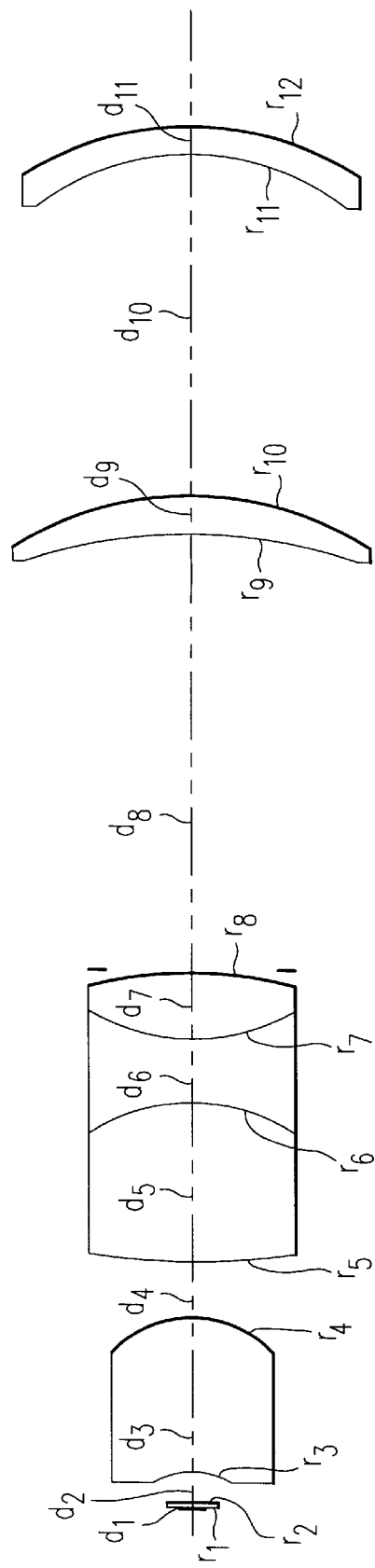
FIG. 2 shows a sectional view of Embodiment 2 of the present microscope objective lens system.
Figure 3:
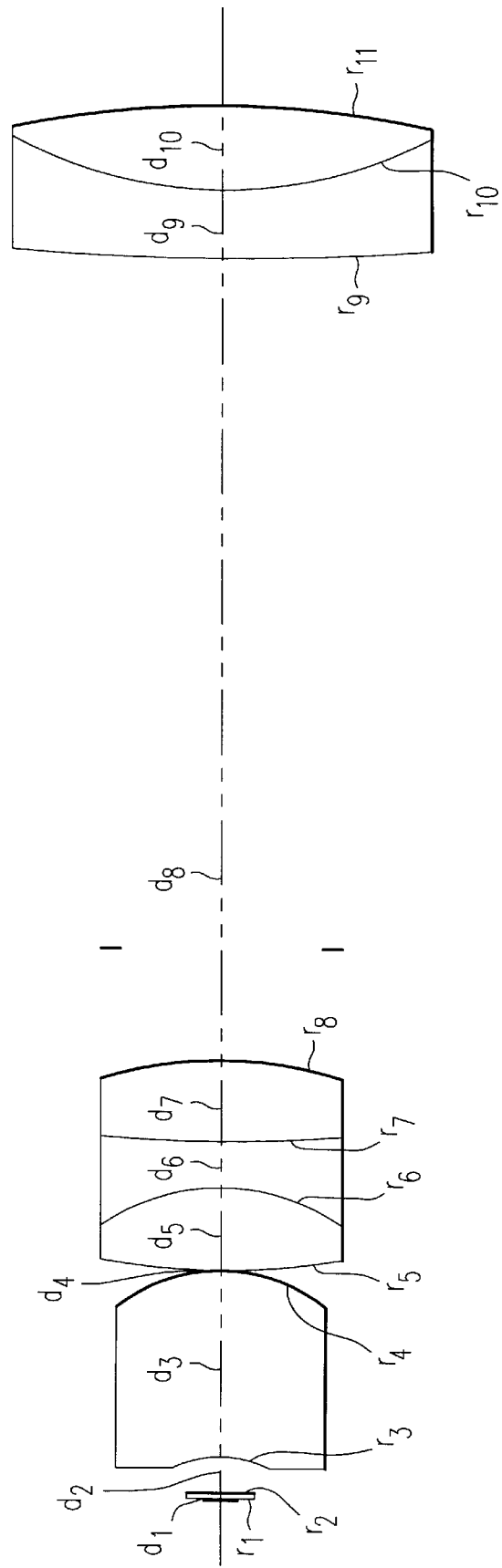
FIG. 3 shows a sectional view of Embodiment 3 of the present microscope objective lens system.

Each of Embodiments 1, 2, 3 depicted respectively in FIGS. 1, 2, and 3 have, as the first lens group, a relatively thick positive meniscus lens with thickness $d_3$. The second lens group is the cemented triplet consisting of the three lens components having thicknesses respectively $d_5$, $d_6$, and $d_7$.

The third lens group varies more amongst the three embodiments. In Embodiment 1, the third lens group, includes a biconvex positive singlet (thickness $d_9$) and a negative thin meniscus lens component (thickness $d_{11}$).

In Embodiment 2, the third lens group includes a negative thin meniscus lens component (thickness $d_9$) and a positive thin meniscus lens component (thickness $d_{11}$). In Embodiment 3, the third lens group is a positive cemented doublet, consisting of two lens components having thicknesses respectively $d_9$ and $d_{10}$.

The function of the third lens group in all depicted embodiments is to correct the chromatic and Petzal aberrations caused by the first two lens groups. Note that the dispersion value, i.e. Abbe numbers, for the various lens components shown in Embodiments 1, 2, 3, define glasses which have low transmissivity for ultraviolet, i.e. have relatively high refractive index values. The various glasses as defined by the refractive indices and Abbe numbers for Embodiments 1, 2, and 3 are standard commercially available types.

Of the above conditions, condition (1), i.e. the index of refraction of the biconcave lens component in the cemented triplet which was thickness $d_6$ in each of Embodiments 1, 2, 3. is the most important. The second most important condition is condition (4), which is the is dispersion values for the three lens components in the cemented triplet which have thicknesses respectively $d_5$, $d_6$, and $d_7$ in each of Embodiments 1, 2, 3.

Embodiment 1 f = 10 mm; NA = .4; β = −20X; Wd = 1.2 mm
Petzal's sum = −.0068; Strehl Ratio
for d - Line = 1.000
for C - Line = .999
for F - Line = .996

| No. Radius mm | Thickness/ Spacing mm | Glass Refractive Index | Glass Abbe Number |
|---|---|---|---|
| $r_1$ = Infinity | | | |
| | $d_1$ = .170 | $n_1$ = 1.5222 | $v_1$ = 58.8 |
| $r_2$ = Infinity | | | |
| | $d_2$ = 1.120 | | |
| $r_3$ = −3.967 | | | |
| | $d_3$ = 6.000 | $n_2$ = 1.8041 | $v_2$ = 46.5 |
| $r_4$ = −5.192 | | | |
| | $d_4$ = .100 | | |
| $r_5$ = 35.877 | | | |
| | $d_5$ = 6.000 | $n_3$ = 1.7186 | $v_3$ = 46.8 |
| $r_6$ = −9.601 | | | |
| | $d_6$ = 2.500 | $n_4$ = 1.8046 | $v_4$ = 25.5 |
| $r_7$ = 20.807 | | | |
| | $d_7$ = 2.500 | $n_5$ = 1.6200 | $v_5$ = 60.3 |
| $r_8$ = −16.702 | | | |
| | $d_8$ = 21.910 | | |
| $r_9$ = 29.470 | | | |
| | $d_9$ = 3.500 | $n_6$ = 1.8038 | $v_6$ = 33.9 |
| $r_{10}$ = −130.492 | | | |
| | $d_{10}$ = .200 | | |
| $r_{11}$ = 24.033 | | | |
| | $d_{11}$ = 1.000 | $n_7$ = 1.6688 | $v_7$ = 32.2 |
| $r_{12}$ = 13.121 | | | |

Figure 4A:
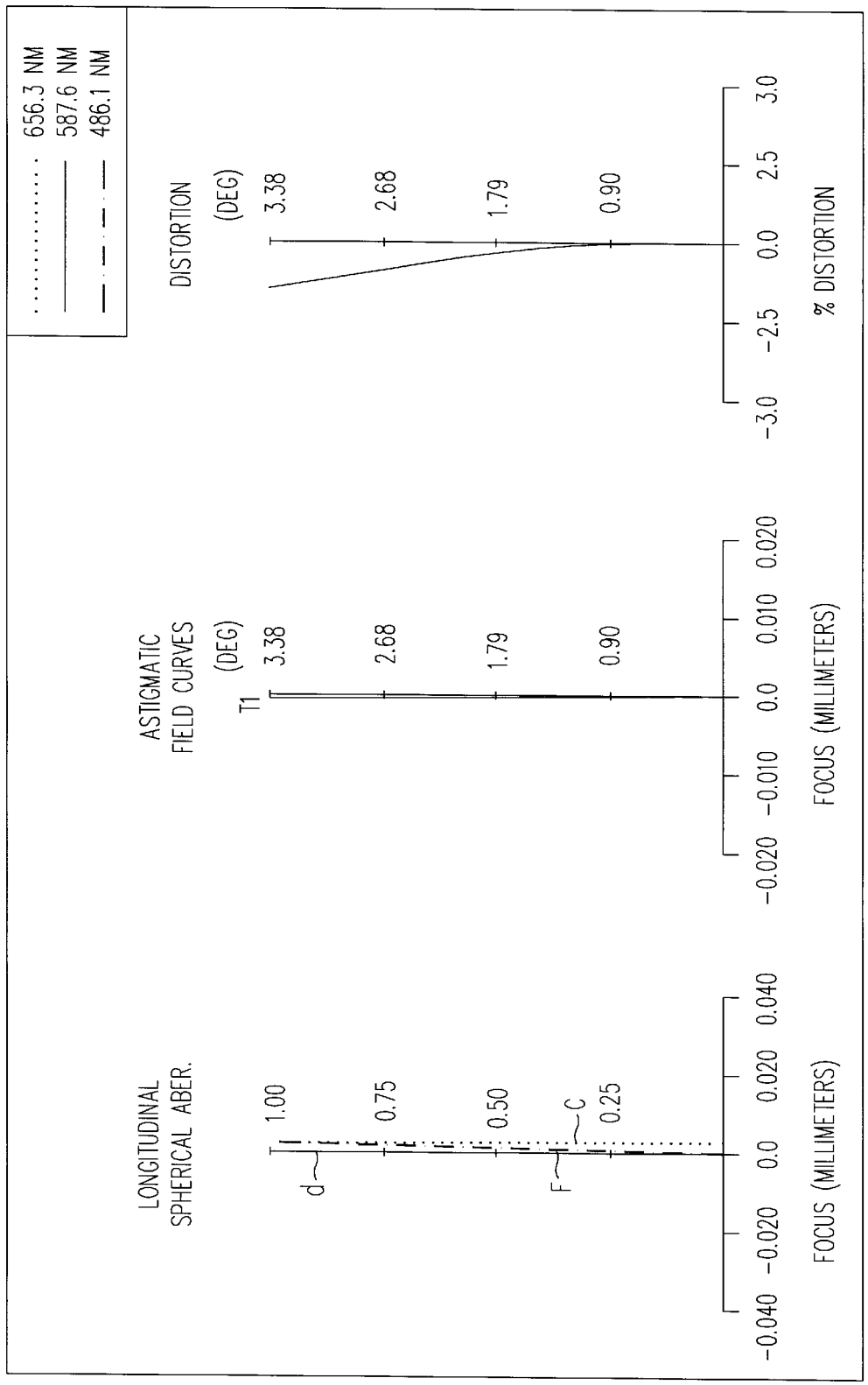
FIG. 4 shows graphs illustrating aberration curves of Embodiment 1.
Figure 4B:
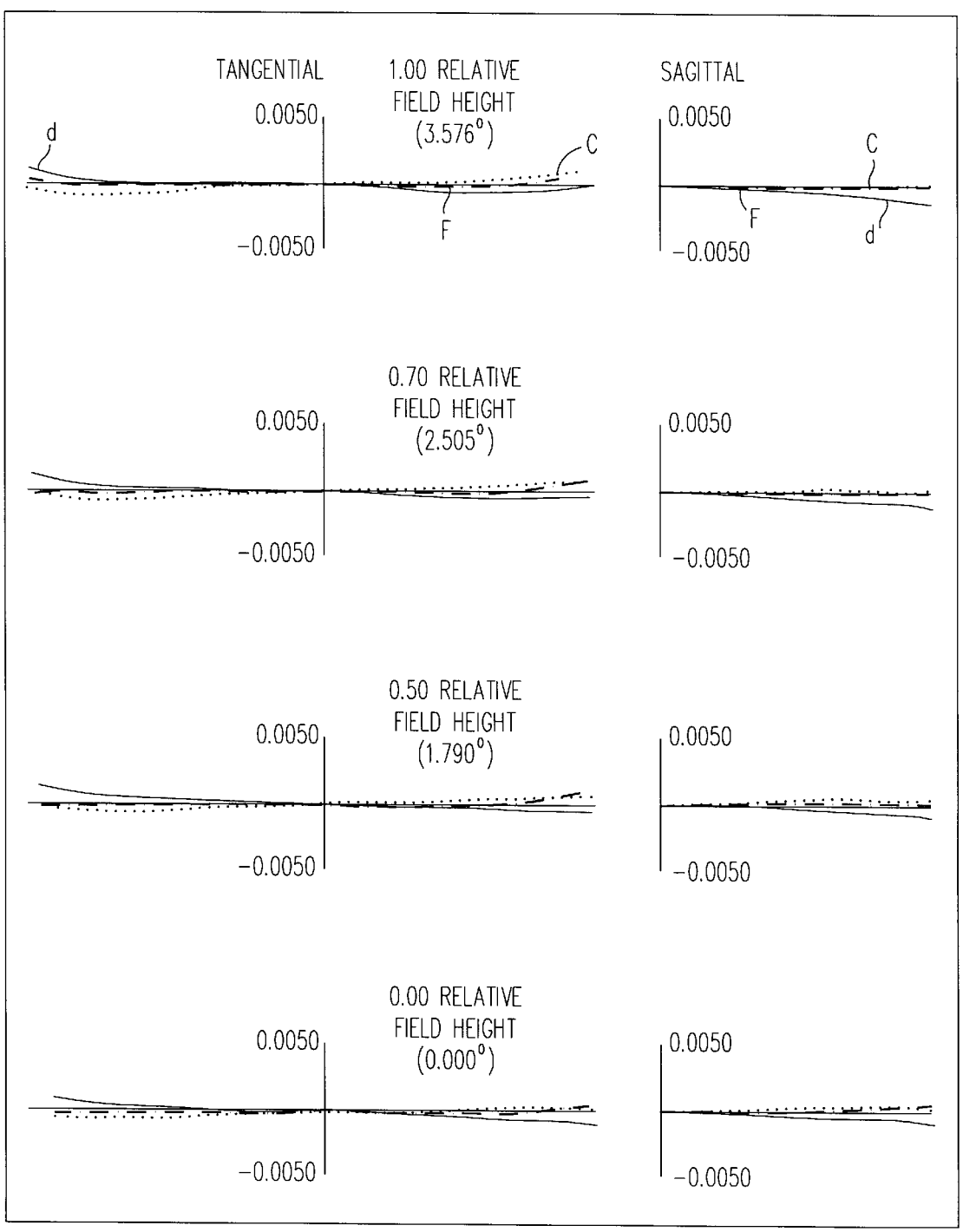

FIG. 4 shows graphically various aberration curves associated with Embodiment 1.

Figure 5A:
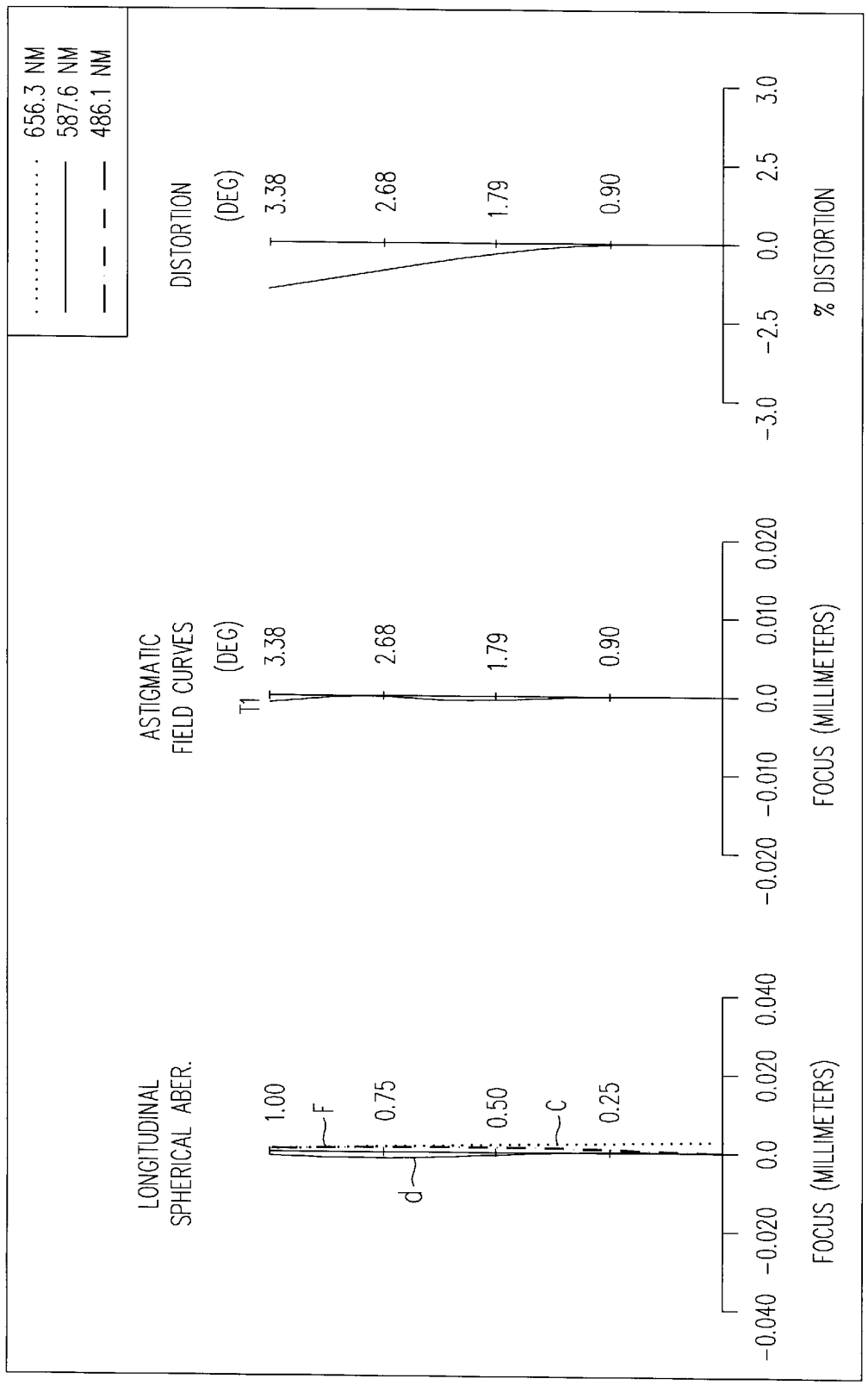
FIG. 5 shows graphs illustrating aberration curves of Embodiment 2.
Figure 5B:
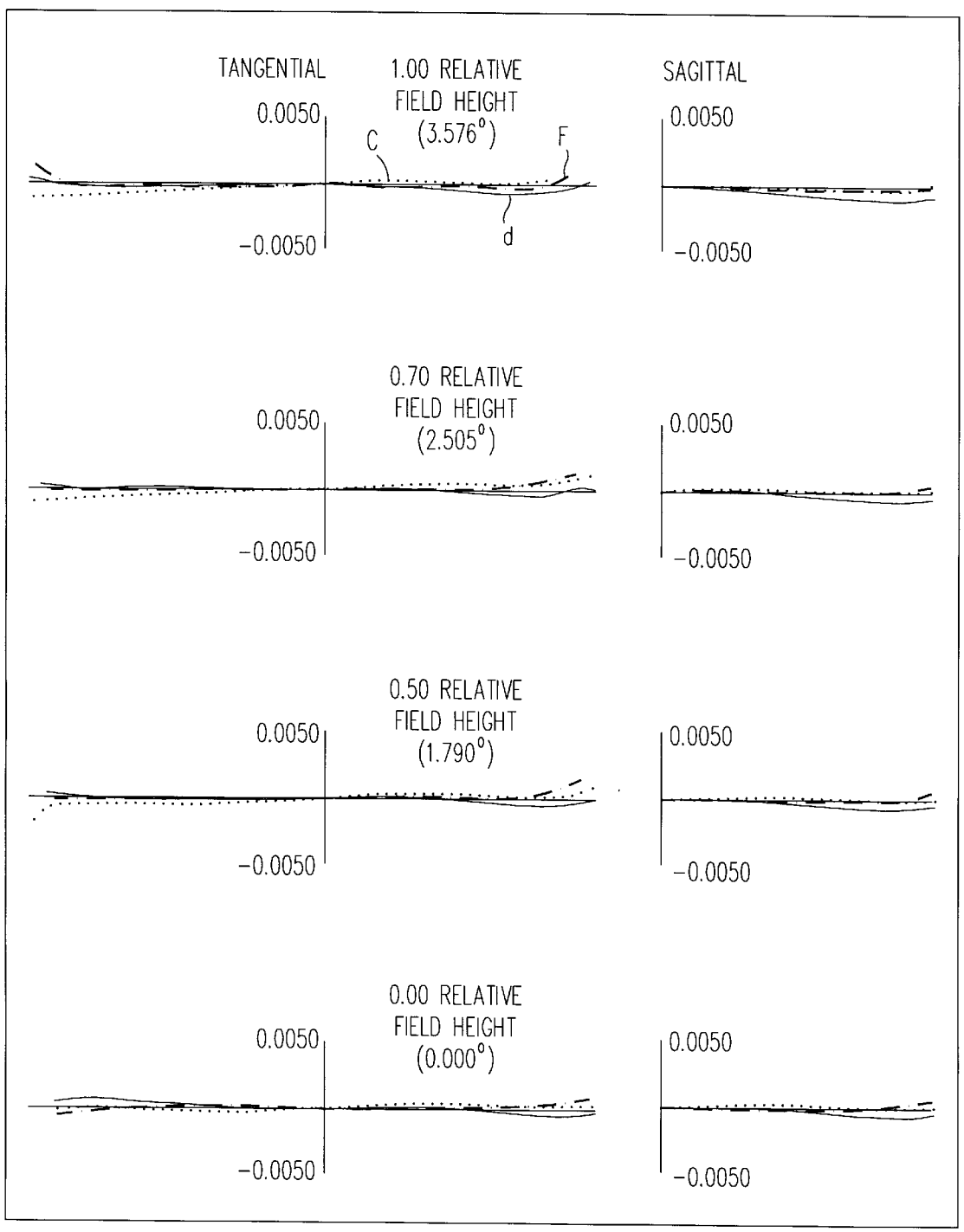
Figure 6A:
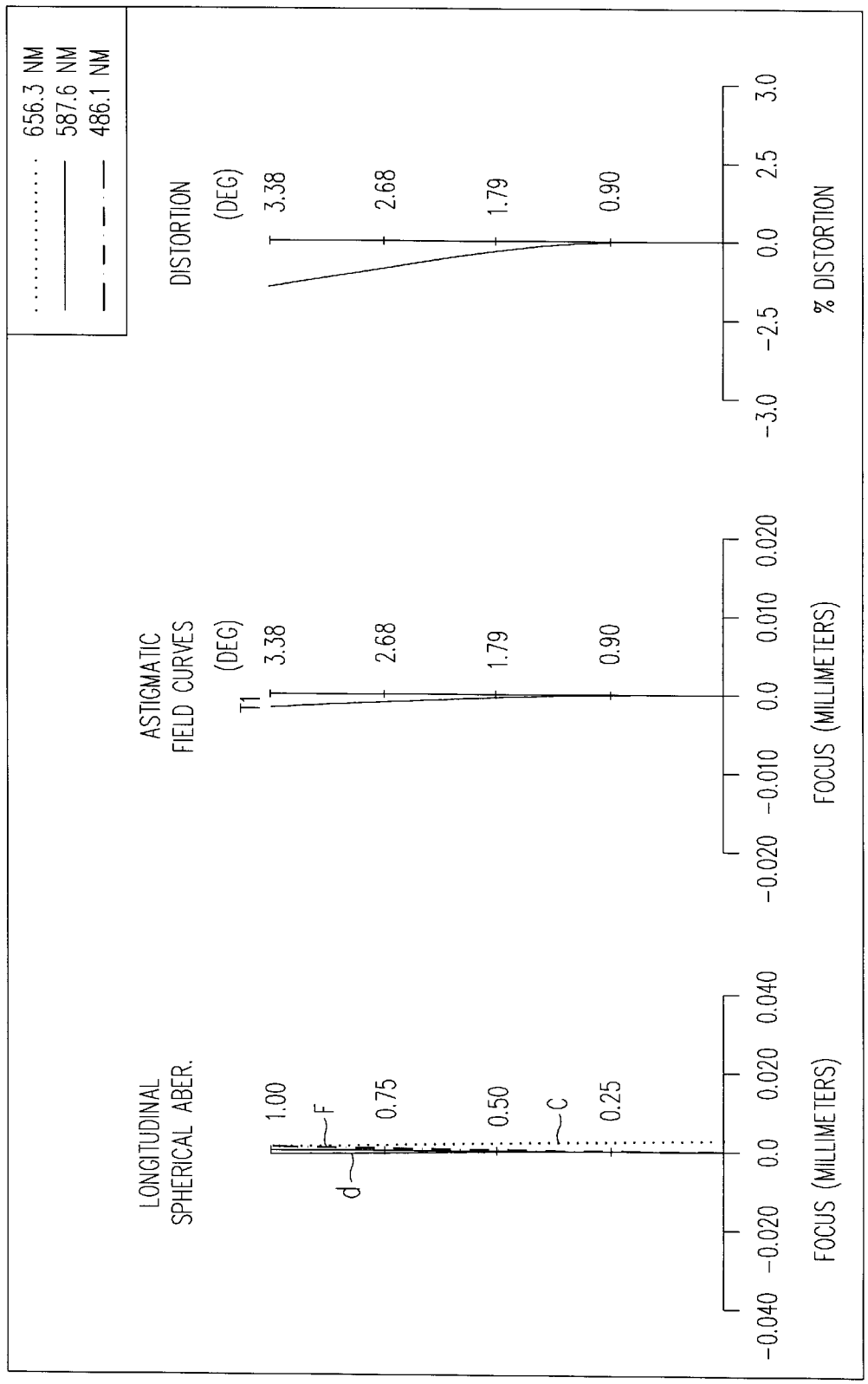
FIG. 6 shows graphs illustrating aberration curves of Embodiment 3.
Figures 6, 6B:
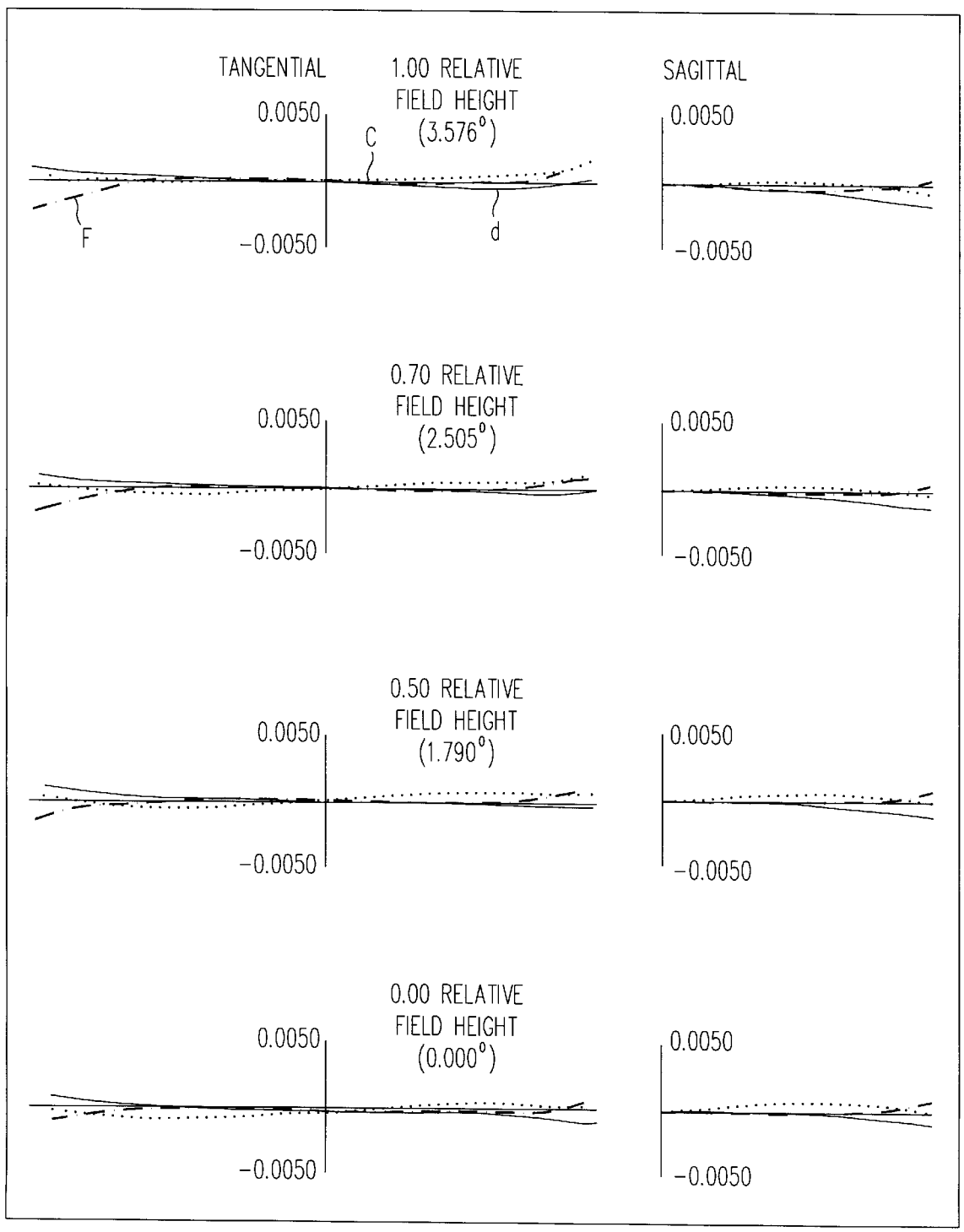

FIGS. 2 and 3 show respectively Embodiments 2 and 3, with the associated optical listings following. The associated aberration curves are shown in FIG. 5 for Embodiment 2 and in FIG. 6 for Embodiment 3. These aberration curves are based on ray tracing from the tube lens side. Each of Embodiments 1, 2, 3 meet the above-described conditions (1) to (5). However, even in the terms of the first and second lens groups, the embodiments of FIGS. 1, 2, and 3 differ from each other, in terms of the lens component curvatures, the glasses, and the thicknesses/distances between optical surfaces.

It is to be understood that while three embodiments are depicted, other embodiments would also fall within the scope of the present invention as described herein, and the depicted embodiments are exemplary.

Embodiment 2 f = 10 mm; NA = .4; β = −20X; Wd = 1.2 mm
Petzal's sum = −.0128; Strehl Ratio
for d - Line = .997
for C - Line = .994
for F - Line = .999

| No. Radius mm | Thickness/ Spacing mm | Glass Refractive Index | Glass Abbe Number |
|---|---|---|---|
| $r_1$ = Infinity | | | |
| | $d_1$ = .170 | $n_1$ = 1.5222 | $v_1$ = 58.8 |
| $r_2$ = Infinity | | | |
| | $d_2$ = 1.120 | | |
| $r_3$ = −4.087 | | | |
| | $d_3$ = 5.923 | $n_2$ = 1.7529 | $v_2$ = 29.8 |
| $r_4$ = −4.909 | | | |
| | $d_4$ = 2.147 | | |
| $r_5$ = 27.195 | | | |

-continued

| No. Radius | Thickness/ Spacing | Glass Refractive Index | Glass Abbe Number |
|---|---|---|---|
| $r_6 = -8.500$ | | | |
| | $d_5 = 6.000$ | $n_3 = 1.7276$ | $v_3 = 46.0$ |
| $r_7 = 8.402$ | $d_6 = 2.500$ | $n_4 = 1.8046$ | $v_4 = 25.50$ |
| $r_8 = -17.794$ | $d_7 = 2.500$ | $n_5 = 1.6200$ | $v_5 = 60.3$ |
| $r_9 = -20.655$ | $d_8 = 17.02$ | | |
| $r_{10} = -12.824$ | $d_9 = 1.500$ | $n_6 = 1.8607$ | $v_6 = 23.0$ |
| $r_{11} = -10.165$ | $d_{10} = 13.226$ | | |
| $r_{12} = -13.086$ | $d_{11} = 1.000$ | $n_7 = 1.8046$ | $v_7 = 25.50$ |

Embodiment 3 f = 10 mm; NA = .4; β = −20X; Wd = 1.2 mm
Petzal's sum = −.0124; Strehl Ratio
for d - Line = .996
for C - Line = .988
for F - Line = .988

| No. Radius mm | Thickness/ Spacing mm | Glass Refractive Index | Glass Abbe Number |
|---|---|---|---|
| $r_1 =$ Infinity | | | |
| | $d_1 = .170$ | $n_1 = 1.5222$ | $v_1 = 58.8$ |
| $r_2 =$ Infinity | $d_2 = 1.12$ | | |
| $r_3 = -3.743$ | $d_3 = 6.000$ | $n_2 = 1.7440$ | $v_2 = 44.7$ |
| $r_4 = -5.045$ | $d_4 = 0.100$ | | |
| $r_5 = 37.177$ | $d_5 = 2.500$ | $n_3 = 1.6332$ | $v_3 = 57.8$ |
| $r_6 = -6.791$ | $d_6 = 1.500$ | $n_4 = 1.8046$ | $v_4 = 25.5$ |
| $r_7 = 107.358$ | $d_7 = 2.500$ | $n_5 = 1.7440$ | $v_5 = 44.7$ |
| $r_8 = -13.600$ | $d_8 = 26.016$ | | |
| $r_9 = 184.417$ | $d_9 = 2.200$ | $n_6 = 1.7440$ | $v_6 = 44.7$ |
| $r_{10} = 15.195$ | $d_{10} = 2.600$ | $n_7 = 1.5517$ | $v_7 = 46.6$ |
| $r_{11} = -31.923$ | | | |

The following shows values (not absolute values) of the refractive power of the first, second and third lens components of the second lens group for each of the above-described three embodiments:

| Embodiment | $\phi_1$ | $\phi_2$ | $\phi_3$ |
|---|---|---|---|
| 1 | .08964 | −.127 | .0652 |
| 2 | .1044 | −.203 | .1047 |
| 3 | .10784 | −.127 | .0611 |

This disclosure is illustrative and not limiting; further modifications will be apparent to one skilled in the art in light of this disclosure and are intended to fall within the scope of the appended claims.

I claim:

1. A microscope objective lens system comprising, in order from the object to the image side:
   a first lens group comprising a positive meniscus lens component arranged concave toward the object side;
   a second lens group including a biconvex cemented positive triplet which has a biconvex positive first lens component, a biconcave negative second lens component having an index of refraction of at least 1.75, and a biconvex positive third lens component;
   a third lens group; and
   wherein said microscope objective lens system has a total of no more than six lens components.

2. The lens system of claim 1, wherein an Abbe number of the biconcave negative second lens component is less than 29.

3. The lens system of claim 1, wherein $$0.5 < \phi_1/\phi_2 < 1$$

wherein $\phi_1$ is the absolute value of the refractive power of the biconvex positive first lens component of the second lens group and $\phi_2$ is the absolute value of the refractive power of the biconcave negative second lens component of the second lens group.

4. The lens system of claim 1, wherein $$1.8 < \phi_2/\phi_3 < 2.2$$

wherein $\phi_2$ is the absolute value of the refractive power of the biconcave negative second lens component of the second lens group and $\phi_3$ is the absolute value of the refractive power of the biconvex positive third lens component of the second lens group.

5. The lens system of claim 1, wherein a sum of the Abbe numbers of the lens components of the second lens group is at least 125.

6. The lens system of claim 1, wherein $$0.06 \leq n_4/v_4 \leq 0.1,$$

wherein $n_4$ and $v_4$ are respectively the refractive index and Abbe number of the biconcave negative second lens component of the second lens group.

7. The lens system of claim 1, wherein the third lens group consists of a biconvex positive singlet lens component and a negative meniscus lens component.

8. The lens system of claim 1, wherein the third lens group consists of a negative meniscus lens component and a positive meniscus lens component.

9. The lens system of claim 1, wherein the third lens group consists of a positive meniscus doublet.

10. The lens system of claim 1, having an optical power in a range of about ×16 to ×24.

11. A microscope objective lens system comprising, in order from the object side to the image side:
    a positive meniscus lens component arranged concave toward the object side;
    a biconvex cemented positive triplet immediately after said positive meniscus lens, wherein said biconvex cemented positive triplet has a biconvex positive first lens component, a biconcave negative second lens component having an index of refraction of at least 1.75 and an Abbe number of less than 29, and a biconvex positive third lens component; and
    two lens components.

12. The lens system of claim 11, wherein the lens system satisfies the following conditions:

$$0.5 < \phi_1/\phi_2 < 1$$
$$1.8 < \phi_2/\phi_3 < 2.2$$
$$v_3 + v_4 + v_5 \geq 125$$
$$0.06 \leq n_4/v_4 \leq 0.1$$

where $\phi_1$, $\phi_2$, $\phi_3$, and $v_3$, $v_4$, $v_5$ are respectively the absolute value of the refractive power and the Abbe number of the biconvex positive first lens component, the biconcave negative second lens component, and the biconvex positive third lens component, and $n_4$ is the refractive index of the biconcave negative second lens component.

13. A microscope objective lens system comprising, in order from the object side to the image side:

a positive meniscus lens component arranged concave toward the object side, wherein said positive meniscus lens component is a closest lens component to the object;

a biconvex cemented positive triplet immediately after said positive meniscus lens, wherein said biconvex cemented positive triplet has a biconvex positive first lens component, a biconcave negative second lens component having an index of refraction of at least 1.75, and a biconvex positive third lens component; and two lens components.

14. The lens system of claim 13, wherein an Abbe number of the biconcave negative second lens component is less than 29, and the lens system satisfies the following conditions:

$0.5 < \phi_1/\phi_2 < 1$ $1.8 < \phi_2/\phi_3 < 2.2$ $\nu_3 + \nu_4 + \nu_5 \geq 125$ $0.06 \leq n_4/\nu_4 \leq 0.1$ where $\phi_1$, $\phi_2$, $\phi_3$, and $\nu_3$, $\nu_4$, $\nu_5$ are respectively the absolute value of the refractive power and the Abbe number of the biconvex positive first lens component, the biconcave negative second lens component, and the biconvex positive third lens component, and $n_4$ is the refractive index of the biconcave negative second lens component.

15. A microscope objective lens system comprising, in order from the object to the image side:

a first lens group comprising a positive meniscus lens component arranged concave toward the object side;

a second lens group including a biconvex cemented positive triplet which has a biconvex positive first lens component, a biconcave negative second lens component having an index of refraction of at least 1.75 and an Abbe number of less than 29, and a biconvex positive third lens component;

a third lens group.

16. The lens system of claim 15, wherein the lens system satisfies the following conditions:

$0.5 < \phi_1/\phi_2 < 1$ $1.8 < \phi_2/\phi_3 < 2.2$ $\nu_3 + \nu_4 + \nu_5 \geq 125$ $0.06 \leq n_4/\nu_4 \leq 0.1$ where $\phi_1$, $\phi_2$, $\phi_3$, and $\nu_3$, $\nu_4$, $\nu_5$ are respectively the absolute value of the refractive power and the Abbe number of the biconvex positive first lens component, the biconcave negative second lens component, and the biconvex positive third lens component, and $n_4$ is the refractive index of the biconcave negative second lens component.

* * * * *